US005261996A

United States Patent [19]

Rossini

[11] Patent Number: 5,261,996

[45] Date of Patent: Nov. 16, 1993

[54] GUIDING SYSTEM FOR A VACUUM WHEEL APPLICATOR

[75] Inventor: Steven J. Rossini, St. Paul, Minn.

[73] Assignee: Minnesota Mining and Manufacturing Company, St. Paul, Minn.

[21] Appl. No.: 646,104

[22] Filed: Jan. 25, 1991

[51] Int. Cl.$^5$ .............................................. B32B 31/00

[52] U.S. Cl. .................................... 156/521; 156/519; 156/522; 156/556; 156/497; 83/102; 83/104; 83/109; 83/184; 83/189; 226/97; 226/197; 294/64.3

[58] Field of Search ............... 156/519, 521, 522, 556, 156/568, 82, 497; 294/64.3; 83/109, 102, 104, 184, 189; 226/97, 197

[56] References Cited

U.S. PATENT DOCUMENTS

| | | | |
|---|---|---|---|
| 2,291,841 | 8/1942 | Staude | 93/61 |
| 2,723,604 | 11/1955 | Fischer | 93/61 |
| 2,990,081 | 6/1961 | De Neui et al. | 216/21 |
| 3,075,679 | 8/1960 | Wadey | 226/97 |
| 3,078,022 | 2/1963 | Durbeck et al. | 226/97 |
| 3,270,933 | 12/1963 | Dekker | 226/97 |
| 3,311,032 | 12/1964 | Lucas | 156/519 |
| 3,355,995 | 12/1964 | Borkmann et al. | 156/521 |
| 3,445,314 | 5/1965 | Crim | 156/521 |
| 3,750,511 | 8/1973 | Toensing | 83/337 |
| 3,763,571 | 10/1973 | Vits | 226/97 |
| 3,835,756 | 9/1974 | Bosse | 156/519 |
| 3,980,515 | 9/1976 | Reil et al. | 156/497 |
| 4,061,527 | 12/1977 | Traise | 156/519 |
| 4,337,885 | 7/1982 | Stahler | 226/97 |
| 4,712,727 | 12/1987 | Wyberg | 206/631.3 |
| 4,756,426 | 7/1988 | Wyberg | 206/631.3 |
| 4,762,234 | 8/1988 | Wyberg | 206/631.3 |
| 4,792,048 | 12/1988 | Wyberg | 206/631.3 |
| 4,813,547 | 3/1989 | Wyberg | 206/631.3 |
| 4,813,548 | 3/1989 | Wyberg | 206/631.3 |
| 4,842,177 | 6/1989 | Callender et al. | 226/97 |
| 4,869,372 | 9/1989 | Wyberg | 206/631.3 |
| 4,869,373 | 9/1989 | Wyberg | 206/631.3 |
| 4,872,562 | 10/1989 | Wyberg | 206/631.3 |
| 4,892,243 | 1/1990 | Long et al. | 226/97 |
| 4,909,885 | 3/1990 | Swenson | 156/519 |

*Primary Examiner*—Patrick J. Ryan
*Assistant Examiner*—Merrick Dixon
*Attorney, Agent, or Firm*—Gary L. Griswold; Walter N. Kirn; Mark W. Binder

[57] ABSTRACT

An applicator wheel and guide system are provided in order to accurately align and position web material, either as discrete lengths or as a continuous strip, to articles or a continuous web. Specifically, the guide system includes a lateral edge guide disc rotatable with the applicator wheel which exhibits an edge guide surface at a first point along the periphery of the wheel applicator to precisely laterally align the web material and which moves radially inward from the surface of the applicator wheel at an application point so as not to obstruct the application of the web material to the articles or continuous web moved at a constant rate thereby. Moreover, the guide system includes the provision of an air bar for forming a loop in the supplied strip of web material prior to handling by the wheel applicator. The air bar eliminates roller inertia and guarantees consistent lengths of discrete lengths of web material to be applied to articles or a web when used on a wobbler arm. The edge guide and the air bar increase the accuracy with which web material can be successfully applied to articles or a web with regard to lateral and length alignment, respectively.

35 Claims, 5 Drawing Sheets

Fig. 3
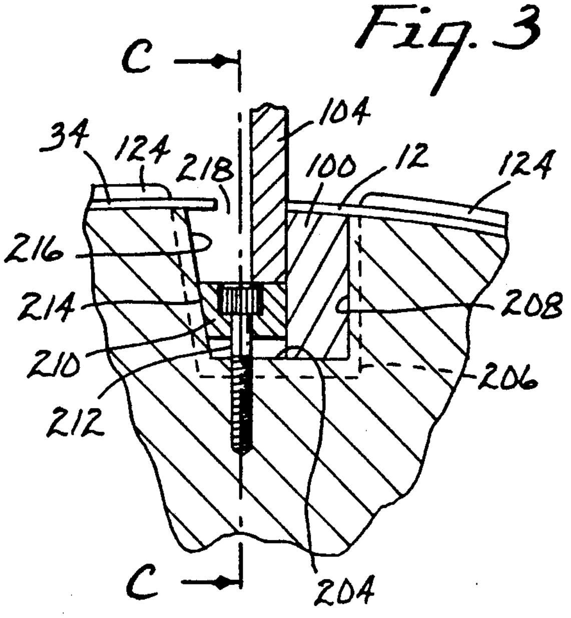
Fig. 4
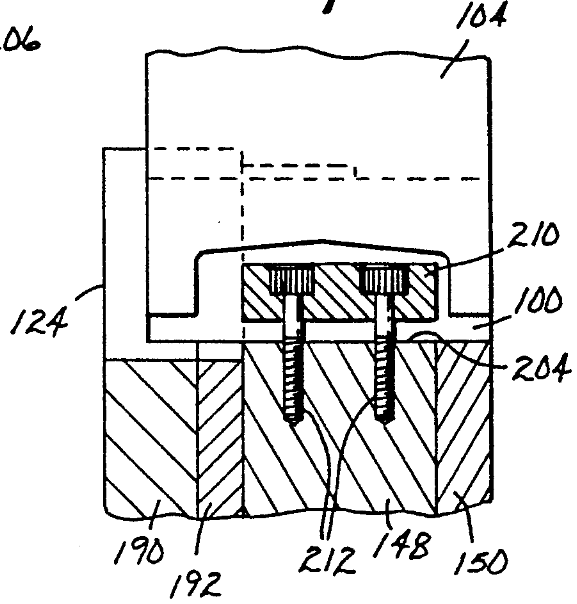
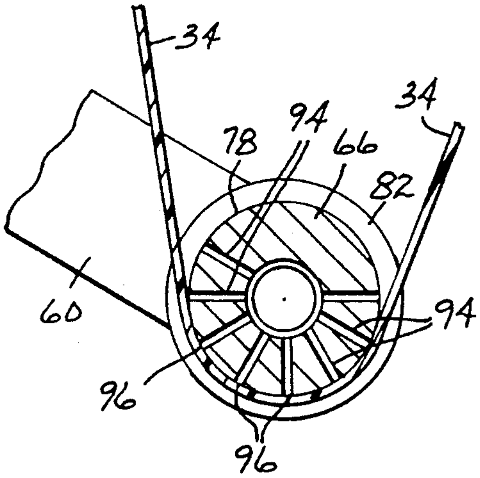
Fig. 6
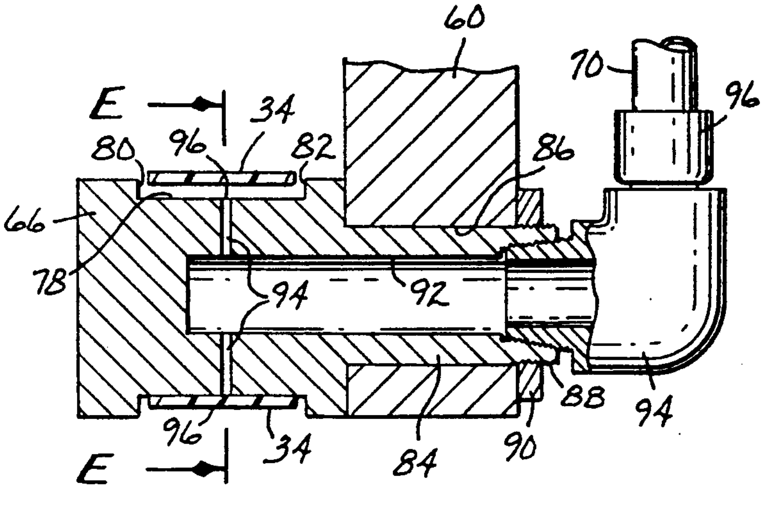
Fig. 5

GUIDING SYSTEM FOR A VACUUM WHEEL APPLICATOR

TECHNICAL FIELD

The present invention relates to systems for guiding a web material to and along a vacuum wheel applicator, wherein a strip of web material is supplied to the vacuum wheel applicator and then applied to a continuously moving web or sequence of articles. More particularly, the present invention is directed to a system which guides the strip of web material to the vacuum wheel and aligns the web material on the vacuum wheel for accurate cutting of the web material into discrete lengths and precise application of the discrete lengths of web material to the moving articles at specific locations thereon.

BACKGROUND OF THE INVENTION

A basic task to which the present invention is directed is the application of discrete lengths of tapes, films, foils or the like to larger articles, such as container blanks, envelopes, continuous webs or the like at specific locations on such articles. In order to do this most effectively and efficiently, it is desired to apply the discrete lengths of web material to articles as they are moved continuously, while maximizing the speed at which the articles are moved relative to the applying system. Moreover, the discrete lengths should come from a strip of web material that is provided from a continuous supply such as a roll and is severed into the discrete lengths of web material to be continuously transferred to the articles for precise placement thereon.

As is well known, vacuum wheels can be used as a part of a cutting system, as the transfer means for moving discrete lengths of web material from a cutting point to an application point, and for applying the discrete length of web material to a continuously moving article passed thereby. Typically, such vacuum wheels include a plurality of evenly spaced anvils located on the periphery of the vacuum wheel which cooperate with a like number of knives or an integral fraction thereof also evenly spaced about the periphery of an adjacent cutting wheel. The vacuum wheel and cutting wheel are relatively rotated and timed with respect to one another such that the knives sequentially engage the anvils at a cutting point of the apparatus. A continuous length of web material is fed to the peripheral surface of the vacuum wheel prior to the cutting point at a set feed rate, while the vacuum wheel is rotated at an angular velocity providing a faster surface speed of its outer peripheral surface than the feed rate of the web material supply. Then, at the cutting point the continuous length of web material is severed into discrete lengths each time a knife of the cutting wheel is brought into cooperating contact with an anvil of the vacuum wheel. Thereafter, each discrete length of web material is moved at the speed of the vacuum wheel to an application point at which the discrete length of web material is applied to the article as it is moved tangentially to the vacuum wheel by a continuous conveying means.

Examples of machines in accordance with the above described in U.S. Pat. Nos. 2,291,841 to Staude, 2,723,604 to Fischer, 2,990,081 to De Neui et al., and 3,750,511 to Toensing. The Staude and Fischer patents are specifically directed to the application of patches or windows cut from a supply of web material to articles such as envelopes. De Neui et al. and Toensing, however, are directed to the application of discrete lengths of adhesive tape to the surfaces of articles generally. Although the Staude invention is directed to a transfer wheel that is not a vacuum wheel, it instead uses one or more positively driven belts to hold the cut patches against the transfer wheel between the cutting point and the application point.

In order to position the discrete lengths of web material, whether made from film to be a patch or window or from an adhesive type, onto the articles moved beneath the application point at a specific location on each article, prior art machines generally rely on guiding systems for bringing the contiuous strip of web material to the vacuum wheel and the appropriate timing of the cutting wheel, vacuum wheel, and the conveying means for moving the articles continuously. Such guide means normally include at least one drive roll for advancing the strip of web material at the aforementioned set feed rate to the vacuum wheel. The guide means typcially also includes one or more guide rollers which generally laterally align the strip of web material onto the circumferential surface of the vacuum wheel. Furthermore, the set feed rate at which the strip of web material is supplied determines the length of each discrete length of web material to be applied to the article.

These machines are satisfactory for positioning patches, windows of pieces of tape to articles at specific locations on the articles that do not require precise alignment; however, such machines are unsatisfactory in situations where very precise positioning of a discrete length of web material is required on the article passed through the machine. In other words, although these prior art machines do bring the patches, windows or tape pieces to a specific general location on the article passed through the machine, they are inadequate when it is necessary to very precisely position a discrete length of web material at an exact location on the articles moved through the machine.

One particular problem lies in the lateral alignment of the strip of web material on the peripheral surface of the vacuum wheel. As above, heretofore this has been accomplished be relying on a guide roller or series of such rollers from which the strip is advanced to the vacuum wheel. Such, however, does not prevent the strip from wandering from side to side as it engages with the surface of the vacuum wheel. In one known method for assisting the lateral alignment, a fixed flange has been provided around a peripheral edge of the vacuum wheel against which an edge of the strip of web material rides. The problem with the provision of such a flange is that the flange must extend along the periphery of the circumferential surface around the entire vacuum wheel which thus becomes an obstruction at the point of application of the vacuum wheel to the articles conveyed thereby. Thus, such a vacuum wheel could not be used in the most common instances because the presence of the flange at the application point of the vacuum wheel to the articles would reduce the applying pressure from the vacuum wheel or would damage the article. Moreover, such a flanged vacuum wheel is limited by its design to machines having a moving applicator pad upon which the articles are supported at the application point, either radially or axially moving, so that the edges of the articles are moved out of the way of the flange during application. Such machines are disadvantageous in that they are more expensive and complex and typically require cam action to move the applicator pad either axially or radially. Such cam actions experience greater wear problems requiring more maintenance and increasing costs and down time.

Another problem of such vacuum wheel applicators and guide systems happens as a result of the feeding the web material to the vacuum wheel at a slower speed than the surface speed of the vacuum wheel and the cutting of the web material while both the web material and the vacuum wheel are moving. That is, it is difficult to cleanly sever a discrete length of the web material from the strip as it is being fed continuously at a slower rate than the surface rates of both the vacuum wheel and the cutting wheel. There is a tendency for stretching or tearing of the strip during the cutting operation. A well known manner utilized by the prior art for overcoming this problem is to increase the feed rate of the strip to the surface rate of the vacuum wheel during the instance that the strip of web material is cut. To do this, a loop forming roll or wobbler roller is provided on a pivotally mounted arm which is cyclically driven so as to reciprocably move the wobbler roller up and down to increase and decrease the size of the strip loop formed by the roller and to change the feed rate of the strip of web material as compared to the surface rate of the vacuum wheel. More particularly, the pivot arm is driven in one direction to decrease the loop size and thereby momentarily increase the feed rate of the strip of web material to the surface rate of the vacuum wheel so that cutting of the strip of web material occurs at that instant. Then, the pivot arm is driven in the reverse direction to reform or increase the size of the loop in the strip for slowing or even momentarily reversing the strip feed rate once again. Such operation occurs on a cyclic basis and can be appropriately timed with respect to the cyclic operation of the cutting wheel and vacuum wheel so that the strip is brought to the speed of the vacuum wheel at each instance of cutting.

However, even with the provision of a loop forming or wobbler roller for increasing the strip speed to the vacuum wheel speed during cutting, such systems have been found to be unsatisfactory when accurate placement of the discrete lengths of web material are to be applied. In this regard, it has been discovered that inertia experienced by the loop forming or wobbler roller as the roller reverses its rotational direction effects the length of the discrete lengths of web material to be cut. Specifically when the roller is reversed in rotational direction as compared to the rotational direction of feed, the roller pulls the strip of web material slightly back from the vacuum wheel. Thus, the next cut discrete length may be slightly shorter in length, and the next may be too long, and so on. The result is an inconsistency of the discrete lengths of web material applied to the articles. Moreover, the inconsistent discrete lengths of web material affect the longitudinal alignment of the discrete lengths of the web material with respect to the articles. None of the prior art recognizes or addresses this problem.

One particular application which requires the very accurate lateral and longitudinal positioning of a discrete length of web material to an article is the application of a strip or fillet of stiffening material coated with a layer of adhesive to a scored blank of a paperboard gable-top container. The combination of such a strip of stiffening material to a gable-top container blank are disclosed in the following U.S. patents to Wyberg which are commonly owned by the assignee of the present invention: U.S. Pat. No. 4,712,727 issued Dec. 15, 1987; U.S. Pat. No. 4,756,426 issued Jul. 12, 1988; U.S. Pat. No. 4,762,234 issued Aug. 9, 1988; U.S. Pat. No. 4,792,048 issued Dec. 20, 1988; U.S. Pat. No. 4,813,547 issued Mar. 21, 1989; 4,813,548 issued Mar. 21, 1989; U.S. Pat. No. 4,869,372 issued Sep. 26, 1989; U.S. Pat. No. 4,869,373 issued Sep. 26, 1989 and U.S. Pat. No. 4,872,562 issued Oct. 10, 1989. The strip is provided as a part of an easy opening feature for gable-top containers and must be accurately aligned with regard to the fold lines and edges of the container blanks in order to work effectively. If the strip is not properly aligned, the container may not fold properly or the easy opening feature may be rendered ineffective. Moreover, it is important to not only precisely align the strip on the blank, it is desired to do so with a maximum of efficiency such that the alignment does not hinder the speeds obtainable by vacuum wheel systems.

SUMMARY OF THE INVENTION

The present invention is directed to a guide system for a vacuum wheel applicator which overcomes the deficiencies of the prior art by ensuring accurate alignment and positioning of discrete lengths of web material to articles or webs that are moved continuously through the vacuum wheel applicator. More specifically, the present invention accurately aligns the web material laterally with respect to the circumferential surface of the vacuum wheel, and substantially reduces or eliminates inconsistent lengths caused by inertial forces present with loop forming or wobbler rollers.

An applicator designed in accordance with the present invention includes a wheel applicator and a guide assembly for applying web material to articles or webs that are moved continuously relative to the applicator wheel. The applicator wheel includes means for holding the web material against a circumferential surface of the wheel applicator and for carrying the web material from a first point at the periphery of the wheel applicator to an angularly spaced point of application. The wheel applicator is also rotatably driven at a predetermined speed by a drive means. The guide assembly comprises an edge guide means rotatable with the applicator wheel provided adjacent to the applicator wheel so as to extend radially outward from the periphery of the applicator wheel at the first point about the applicator wheel for guiding an edge of the web material at that point, and which moves to a position radially inward of the periphery of the applicator wheel at the point of application. The edge guide means advantageously provides a lateral guide which precisely locates one edge of the web material at the first point, but which moves radially inwardly at the point of application so as not to obstruct the application of the web material to an article moved thereunder. Preferably, the wheel applicator is used in conjunction with a cutting wheel which together with the wheel applicator determines a cutting point as the first point, and discrete lengths of web material are transferred by the vacuum wheel to the point of application.

The edge guide means preferably comprises a guide plate rotatably driven by the wheel applicator so as to rotate with the wheel applicator, but which is eccentrically mounted with respect to the axis of rotation of the wheel applicator. Thus, a guide edge is constantly provided for the strip of web material at the cutting station, while the guide edge recedes inwardly from the circumferential surface of the wheel applicator at the point of application so as not to obstruct the application of the discrete lengths of web material.

An applicator machine designed in accordance with the present invention further includes a source of a strip of web material and a drive means, such as drive rollers, for driving the strip of web material from the source to the wheel applicator at a constant feed rate. Preferably, the wheel applicator is a vacuum wheel applicator, wherein vacuum is provided to the circumferential surface of the vacuum wheel applicator for holding and carrying the web material on the circumferential surface. Furthermore, the machine is provided with a cutting wheel including knives of a similar number as there are anvils provided on the vacuum wheel applicator or an integral fraction thereof. The cutting wheel and the vacuum wheel applicator are appropriately driven and timed with respect to one another such that a knife engages each sequential anvil during rotation of both the cutting wheel and the vacuum wheel applicator. In order to apply discrete lengths of web materials at intervals, the vacuum wheel applicator is driven such that its surface speed at its circumferential surface is greater than the feed rate of the strip of web material from its associated drive roller such that the strip of web material slides on the circumferential surface prior to being severed to a discrete length. The greater speed of the vacuum wheel applicator is required to cyclically deliver and apply the discrete lengths of web material to the continuously moving articles or to a continuous web at precise intervals thereon.

Additionally, the present invention is directed to an improved means for engaging the strip of web material as it is fed to the vacuum wheel applicator and which forms a loop in the strip of web material that is cyclically increased and decreased in size for increasing the feed rate of the strip of web material at the cutting point to the surface speed of the vacuum wheel applicator at the instance that cutting takes place. The wobbler arm of the present invention advantageously ensures consistent lengths of the discrete lengths of web material by eliminating roller inertia and comprises a pivot arm which is reciprocally driven and timed with respect to the vacuum wheel applicator and cutter wheel so as to increase the feed rate of the strip of web material as above, and an air bar provided at the distal end of the arm which engages the strip of web material for forming the loop. The air bar does not experience roller inertia since it does not rotate. The air bar comprises a non-rotating bearing surface over which the strip of web material passes and has an air supply bore and a plurality of radially spaced orifices connected to the air supply bore which open to the bearing surface of the air bar over which the web strip material rides. The air supply bore is further connected with a pressurized air source. Thus, as the web of strip material is guided over the air bar, the pressurized air flows from the source through the air supply bore and out of each of the orifices. The strip of web material as it is threaded over the bearing surface provided with the orifices is then lifted off of the bearing surface. As a result, the strip of web material can pass over the air bar when driven without actually contacting the bearing surface of the air bar. In other words, the strip of web material floats around an air cushion of the air bar. The combination of the wobbler arm having an air bar to the feeding system of the strip of web material and the vacuum wheel applicator substantially reduces or eliminates any length inconsistencies of the discrete lengths of web material by inertial forces such as those which result when using a wobbler roller.

The wheel applicator and guide assembly of the present invention advantageously permits a better alignment of the web material to the vacuum wheel for accurate positioning of a discrete length of the web material to an article passed beneath the wheel applicator without obstructing the point of application of the wheel applicator. The air bar wobbler arm advantageously eliminates length inconsistencies of the discrete lengths of web material. This also enhances the accurate positioning of the discrete length of web material since the discrete length of web material is more accurately cut to the exact longitudinal length.

Moreover, in accordance with the present invention, the strip of web material can be any tape, film, foil, or the like which is to be applied to continuously moving articles or continuous webs at precise locations thereon. If the web material is an adhesive tape, such as a pressure sensitive adhesive tape, it may be necessary to remove a protective release layer from the adhesive side of the tape before feeding the tape to the wheel applicator. In this case, an appropriate take-up reel can be provided for winding up the waste protective release layer.

The present invention is particularly applicable to situations where it is required to accurately position a discrete length of strip material to an article at a very precise location thereon. One specific application is the positioning of a strip of stiffening tape or fillet to a container blank. Such a container blank for making a gable-top container therefrom having such a precisely located strip of stiffening tape is described in the following U.S. patents to Wyberg commonly owned by the assignee of the present invention: U.S. Pat. No. 4,712,727 issued Dec. 15, 1987; U.S. Pat. No. 4,756,426 issued Jul. 12, 1988; U.S. Pat. No. 4,762,234 issued Aug. 9, 1988; 4,792,048 issued Dec. 20, 1988; U.S. Pat. No. 4,813,547 issued Mar. 21, 1989; U.S. Pat. No. 4,813,548 issued Mar. 21, 1989; U.S. Pat. No. 4,869,372 issued Sep. 26, 1989; U.S. Pat. No. 4,869,373 issued Sep. 26, 1989 and U.S. Pat. No. 4,872,562 issued Oct. 10, 1989. In such an application, the precise positioning of the strip of stiffening tape is required in order to provide the easy opening feature. Misalignment of the strip of stiffening tape can render the easy opening feature less effective.

Figure 1:
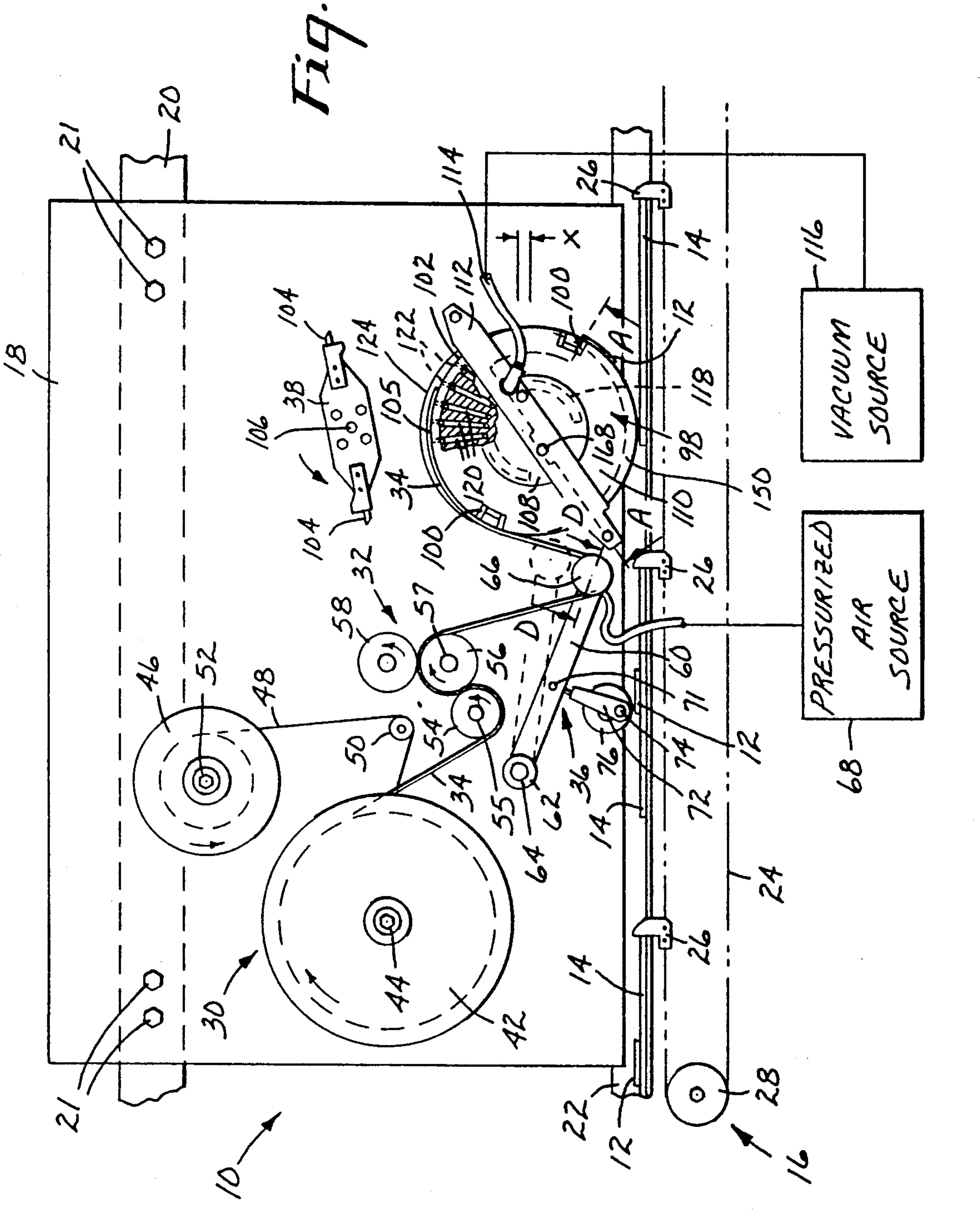
FIG. 1 is a partial schematic view of a machine having a wheel applicator and guide assembly in accordance with the present invention.
Figure 2A:
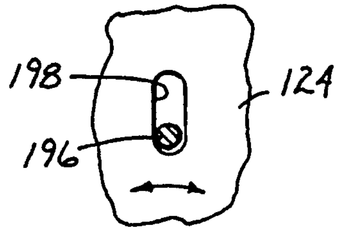
FIG. 2 is a cross-sectional view of a vacuum wheel and edge guide assembly taken along line A—A in FIG. 1.
Figure 2:
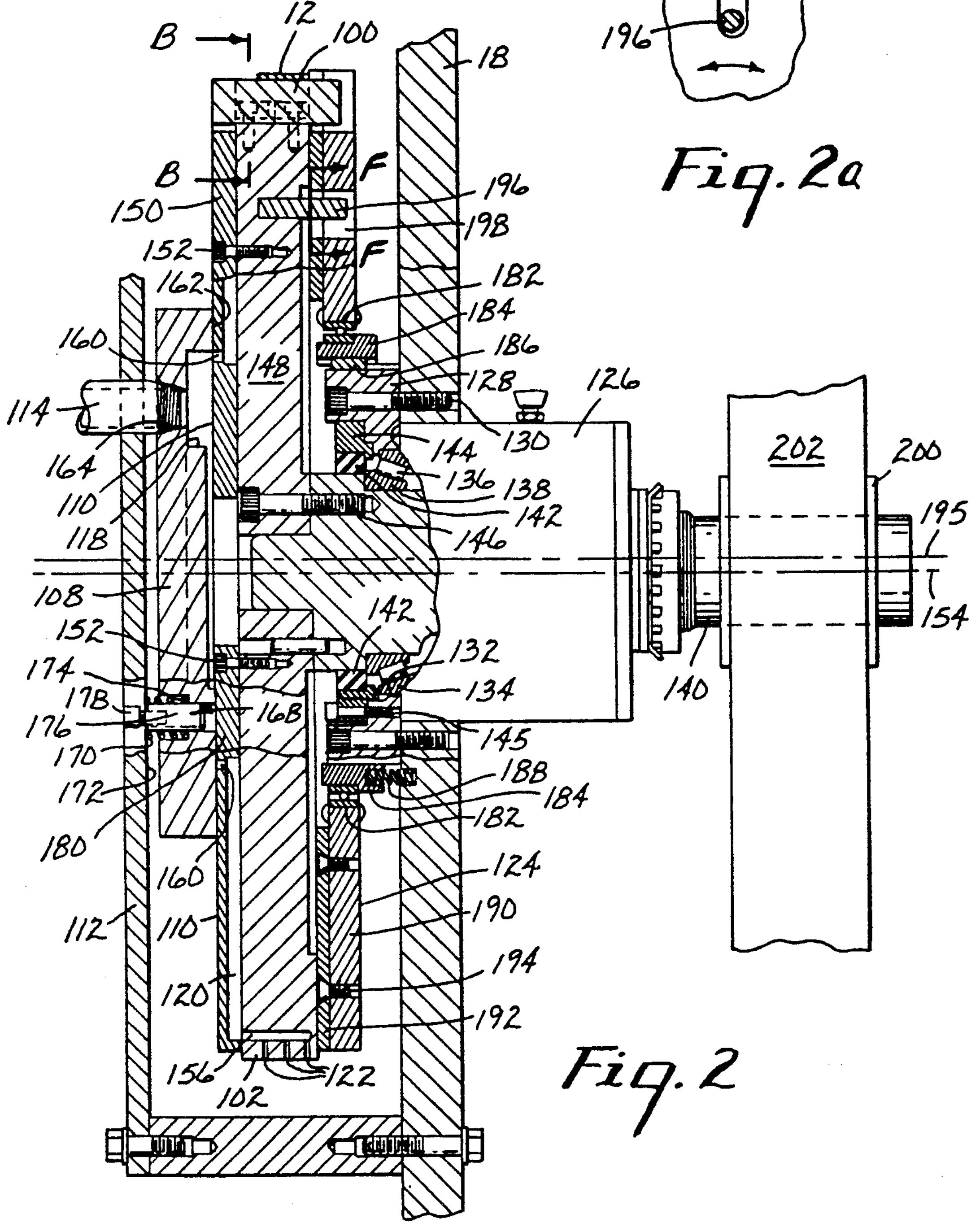
Figure 7:
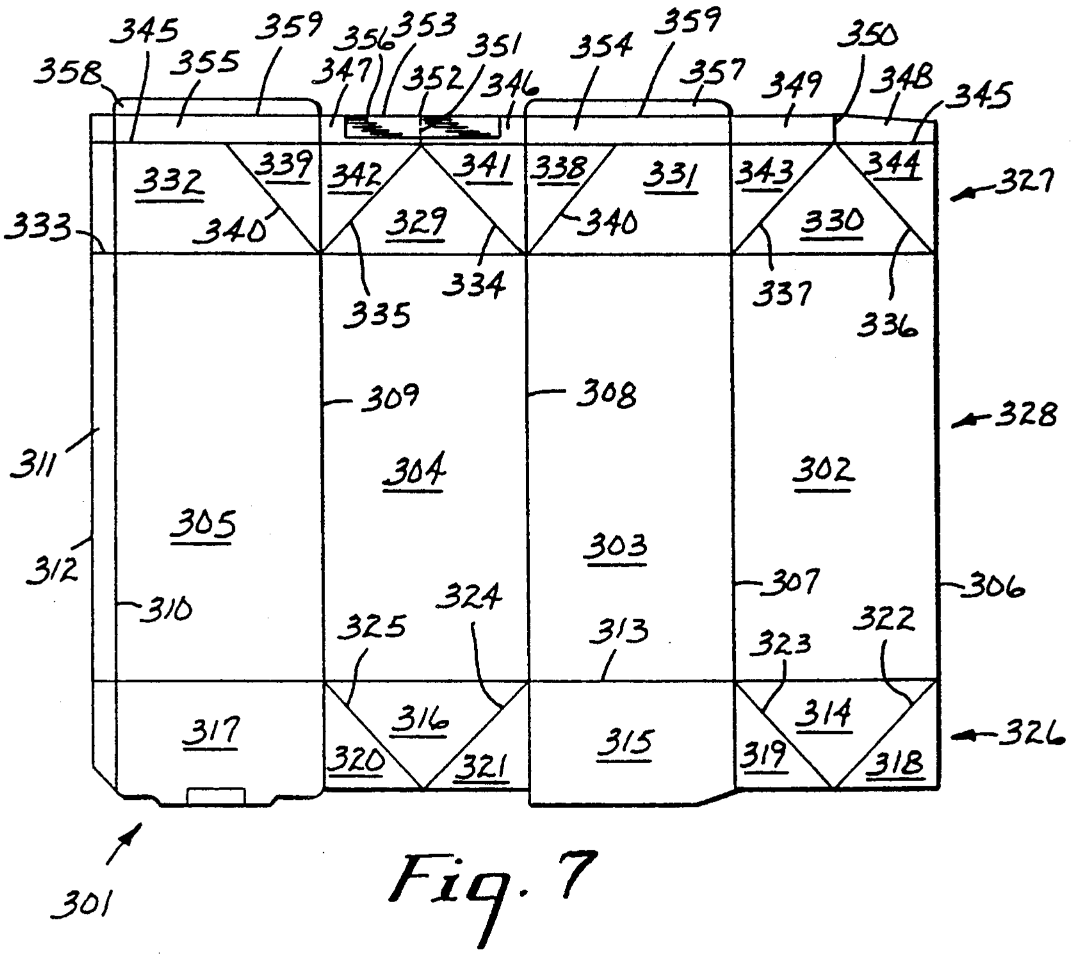
Figure 8:
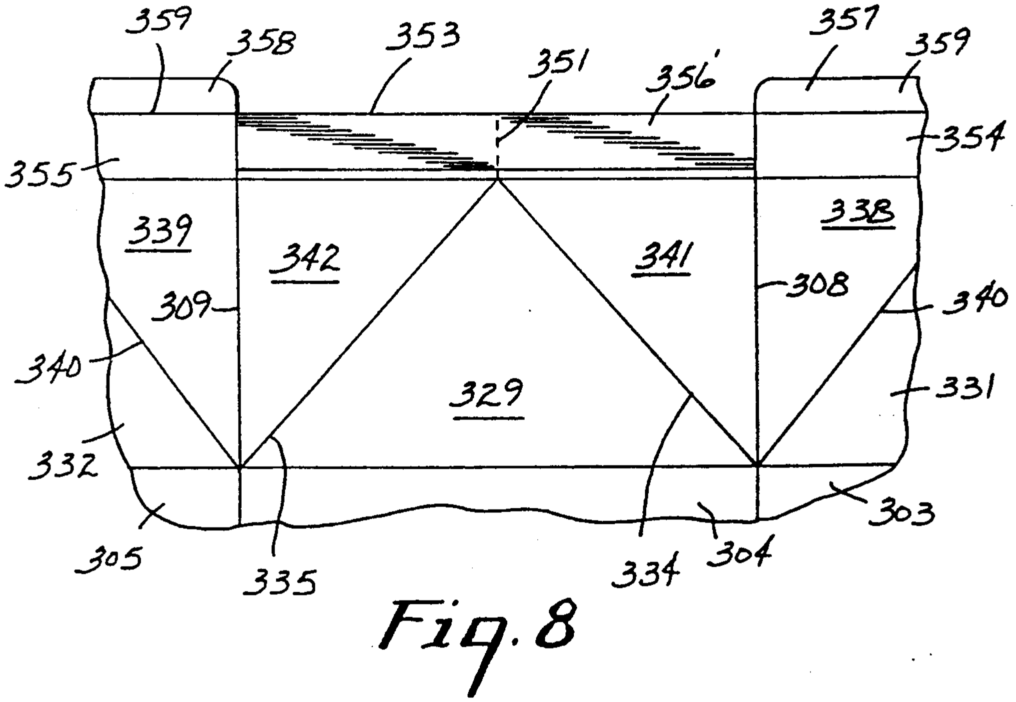
Figure 9:
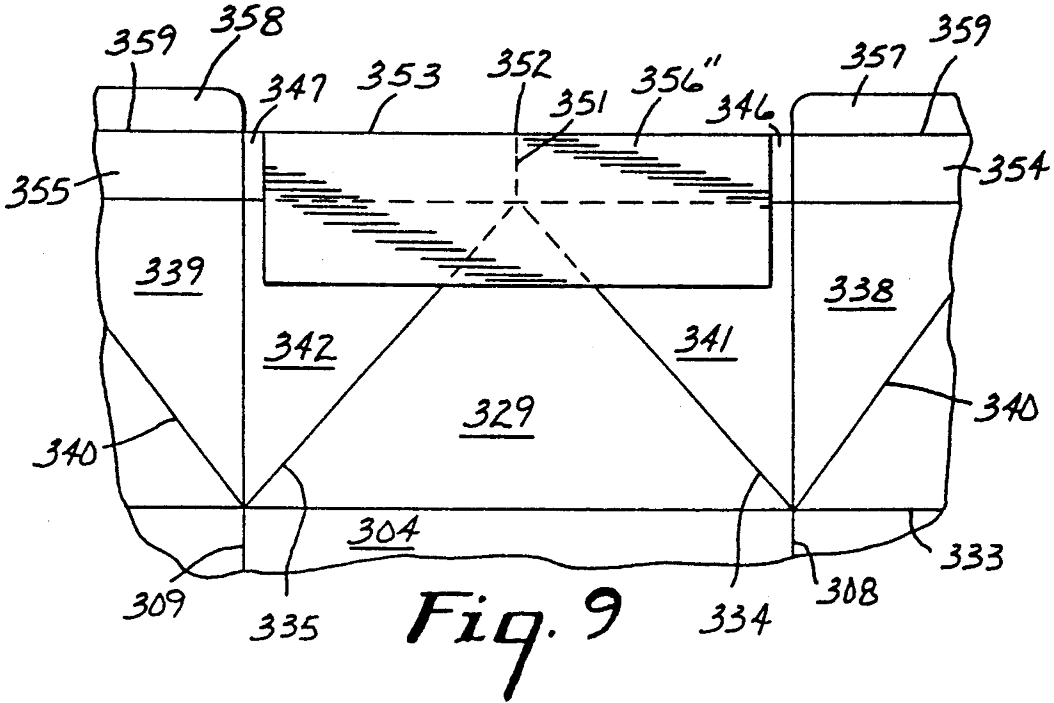
Figure 10:
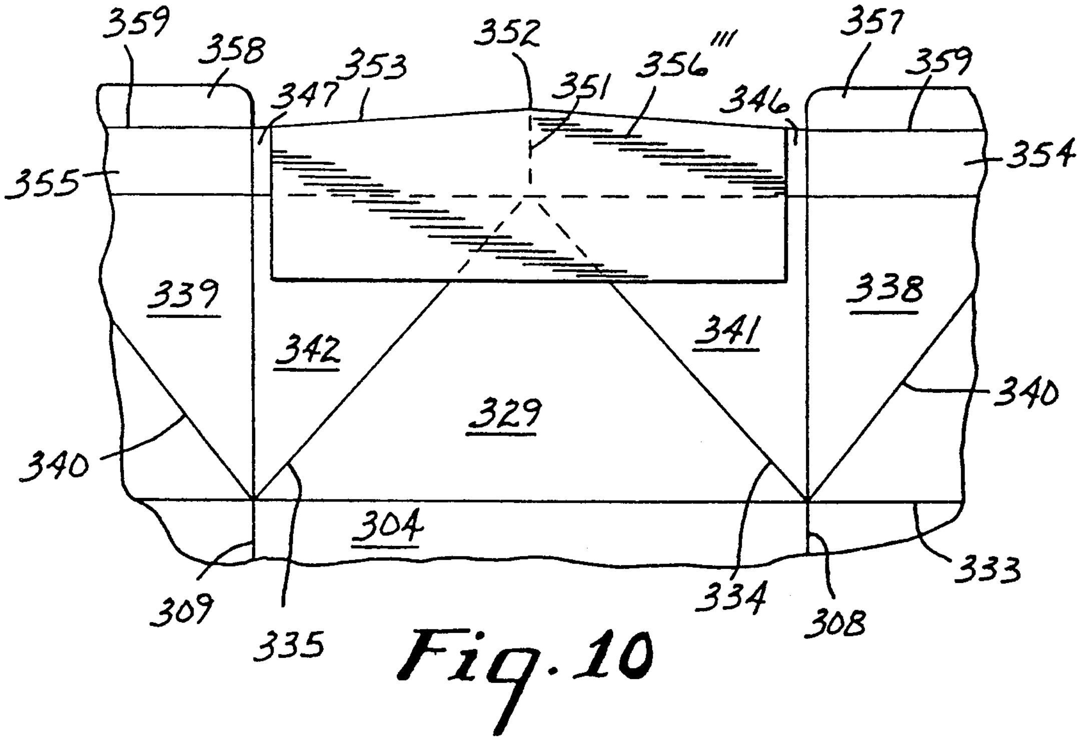

FIG. **2*a* is a cross-sectional view taken along line F—F in FIG. 2** showing a pin and slot drive arrangement;

FIG. 3 is an enlarged cross-sectional view taken along line B—B in FIG. 2 except with the vacuum wheel rotated from the position shown in FIG. 1 so as to locate an anvil and knife at the cutting point;

FIG. 4 is a cross-sectional view taken along line C—C in FIG. 3;

FIG. 5 is a cross-sectional view taken along line D—D in FIG. 1 illustrating a wobbler air bar in accordance with the present invention;

FIG. 6 is a cross-sectional view taken along line E—E in FIG. 5 of the wobbler air bar of the present invention;

FIG. 7 is a plan view of a container blank including a discrete length of stiffening tape which can be applied in accordance with the wheel applicator and guide assembly of the present invention;

FIG. 8 is an enlarged view of the container blank portion and a modified discrete length of tape applied thereto;

FIG. 9 is a view similar to FIG. 8 showing an alternative discrete length of tape applied to the container blank; and FIG. 10 is yet another view similar to FIGS. 8 and 9 showing another embodiment of the container blank and discrete length of tape applied thereto.

DETAILED DESCRIPTION OF THE PREFERRED EMBODIMENTS

With reference to the Figures, wherein like numerals are used to designate like components throughout the several figures, and in particular to FIG. 1, an applicator machine 10 is illustrated for applying discrete lengths of web material 12 to articles 14 passed through the applicator machine 10 as conveyed by conveyer means 16.

The applicator machine 10 comprises a support plate 18 which is further supported in position by a frame 20 of the machine by conventional bolts as shown at 21 or the like. As part of the conveyer means 16, L-shaped guide rails 22 (only one side of which is illustrated) are provided adjacent to the lower edge of the support plate 18 such that the articles 14 can slide along the guide rails 22 as driven by a conventional conveyer chain or belt 24 having spaced elements 26 that engage edges of the articles 14 to drive them continuously along the guide rails 22. A conventional drive sprocket or pulley 28 is illustrated for driving the chain or belt 24. The guide rails 22 as well as the drive sprocket or pulley 28 are supported (not shown) by the frame 20 in a well known manner. Moreover, the drive sprocket or pulley 28 is operatively connected to a drive motor (not shown). Furthermore, the guide rails 22 and the intervals of the spaced elements 26 are dimensioned to accommodate the specific articles 14 so as to consistently and accurately align the articles 14 with respect to the guide rails 22 and spaced elements 26 so that the applicator machine 10 can be timed for positioning the discrete lengths of web material 12 at precise and consistent locations on each of the articles 14.

It is understood that a continuous web could be conveyed by the conveyer means 16 beneath the applicator machine 10 for applying discrete lengths of web material 12 at precisely spaced intervals located along such a continuous web. In such a case, the conveyer means 16 would conventionally drive the continuous web at a substantially constant speed with any particular features thereof, such as indicia, laminations, seams, or the like, timed with respect to the application of the discrete lengths of web material 12 at precise locations thereto. As used throughout this application, all references to articles continuously moved relative to the applicator machine 10 also encompasses a continuous web which may or may not include additional features such as those mentioned above.

Supported on the support plate 18 are four basic components of the applicator machine 10. The first is a source 30 of a strip of web material 34 which will be processed into the discrete lengths of web material 12, as described below. Second, a drive and guide means 32 is provided for driving the strip of web material 34 at a predetermined constant feed rate, and for guiding the strip of web material 34 to be processed into the discrete lengths of web material 12. The drive and guide means 32 additionally includes a wobbler arm loop forming means 36. The third basic component is a cutter wheel 38 which severs the strip of web material 34 into the discrete lengths of web material 12 in conjunction with the last basic component which is a wheel applicator 40.

The source of strip material 30 preferably comprises a spool or reel 42 which is wound with a supply of strip web material 34. The spool or reel 42 is preferably keyed to rotate with a drive shaft 44 which is driven by a drive means (not shown). The strip of web material 34 may constitute an adhesive tape, a film, foil or the like which is to be severed into the discrete lengths of web material 12 and applied to the articles 14. If the strip of web material 34 is an adhesive tape such as having a pressure sensitive adhesive or other adhesive, it may be necessary to remove a protective release layer 48 from the adhesive side of the tape before the tape is advanced to the drive and guide means 32. To do this, a take-up reel 46 is provided for winding thereon the waste strip of the protective release layer 48. The release layer 48 passes over an idler roller 50 and then upon the take-up reel 46 which is also conventionally keyed to a drive shaft 52 and driven by a drive means (not shown). The drive speeds of the supply reel 42 and the take-up reel 46 are appropriately controlled relative to one another in accordance with the feed rate of the strip of web material 34 in a well known manner.

The drive and guide means 32 comprises a pair of drive rollers 54 and 56 for driving the strip of web material 34 at a predetermined constant feed rate. Either drive roller 54 or 56 or both can be directly or indirectly driven by a drive means (not shown) which drives at least one of drive shafts 55 or 57. A third roller is illustrated at 58 which comprises a nip roller if the strip of web material 34 is a film, foil or the like not having an adhesive coating. If the strip of web material 34 comprises an adhesive tape, the nip roller 58 may be provided, but preferably would be eliminated as unnecessary. Moreover, if the strip of web material 34 is an adhesive tape, the drive roller 54, in the illustrated scheme, would also be preferably coated with a material such as a plasma or non-stick material as is well known to reduce the adhesion of the tape to the drive roller as is passes thereover. Preferably a layer of silicone is provided on drive roller 54.

After the strip of web material 34 passes through the drive rollers 54 and 56 (and nip roller 58 if included), the strip of web material 34 is directed downwardly to pass over the wobbler arm loop forming means 36. The means 36 comprises a pivot arm 60 which includes a bearing portion 62 rotatably supported about a fixed pin 64 extending from the support plate 18. The pivot arm 60 is conventionally mounted to the pin 64 to be freely pivotal about the pin 64. At the distal end of the pivot arm 60, an air bar 66 is provided. The air bar 66 is non-rotationally mounted to the pivot arm 60, and is connected to a pressurized air source 68 by way of a fluid pressure line 70. Further in this regard, air from the pressurized air source 68 flows through the fluid pressure line 70 and into the air bar 68 after which pressurized air exits the air bar 66 to provide an air cushion over which the strip of web material floats. The details of the air bar 66 will be described hereinafter.

The wobbler arm loop forming means 36 further includes a cam arm 72 pivotally connected to the pivot arm 70 at 71 and further pivotally connected to a shaft 74 which is mounted to a drive disc 76 offset from the axis of rotation of the drive disc 76. The drive disc 76 is also conventionally driven by a drive means (not shown) and is driven at a speed to move the pivot arm 60 and air bar 66 about pin 64 in a cycle coordinated with the cutting and transfering operation which occurs downstream and is described below. Particularly, an up and down cycle of the pivot arm 60 and air bar 66 between the solid line position and the dotted line position illustrated in FIG. 1 occurs for each cutting operation. More particularly, the pivot arm 60 and air bar 66 are timed such that they have their greatest velocity in the direction that minimizes the size of the formed loop during the time that each cut takes place. The greatest velocity of the air bar 66 upwardly, as seen in FIG. 1, occurs at about midway between the uppermost and lowermost positions; the result of which is minimal relative movement between the strip of web material and the applicator wheel during cutting.

Referring now to FIGS. 5 and 6, the details of the air bar 66 will be more fully described. As can be seen, the air bar 66 includes a circumferential bearing surface 78 bounded at longitudinal edges by guide surfaces 80 and 82. The strip of web material 34 passes over the circumferential bearing surface 78 and between the guide edges 80 and 82. The air bar 66 also includes an extension portion 84 which passes through a bore 86 in the pivot arm 60. The extension portion 84 extends through pivot arm 60 and includes a threaded area 88 onto which a retainer nut 90 is threaded to hold the air bar 66 in position non-rotatonally. It may further be desired to include a key or other means between the extension portion 84 and the bore 86 to ensure non-rotation of the air bar 66. However, it is preferable that the air bar 66 be rotationally adjustably fixed to the pivot arm 60.

An air supply bore 92 is provided open from the end of the extension portion 84 and extends to at least midway longitudinally of the bearing surface 78 within the air bar 66. Preferably the air supply bore 92 is longitudinally centrally located. A plurality of passages 94 are provided connecting the air supply bore 92 to the circumferential bearing surface 78 and forming orifices 96 at the circumferential bearing surface 78. The orifices are preferably located midway between the guide edges 80 and 82 so as to evenly cushion the strip of web material 34 as it passes over the circumferential bearing surface 78. As seen in FIG. 6, the passages 94 and orifices 96 need only be provided along the circumferential bearing surface 78 over the angle of wrap of the web material 34 about the circumferential bearing surface 78. Normally, the orifices 96 only need to be provided over between 90° and 180°; however, more or less could be provided depending on the specific orientation and angle of wrap that will be contacted by the strip of web material 34. Moreover, the number and interval of the orifices can vary widely depending on the angle of wrap, the type of material of the web material to be cushioned, the size of the orifices 96 and the pressure of the air supplied. In the preferred embodiment, such passages 94 and orifices 96 are provided at 30° intervals. The air supply bore 92 is conventionally connected to the fluid pressure line 70 by way of a threaded 90° air fitting 94 and coupler fitting 96. It is also preferable to coat the circumferential bearing surface with a stick resistant material by a tape or layer of silicone or teflon or the like.

Referring again to FIG. 1, the strip of web material 34, after leaving the air bar 66 extends upwardly and onto the wheel applicator 40. The wheel applicator 40 in the preferred embodiment comprises a vacuum wheel 98 provided with a plurality of anvils 100 located adjacent the peripheral edge of the vacuum wheel 98 at evenly spaced points. Of course, other wheel applicators than a vacuum wheel could be used if desired provided some means is provided to hold the strip of web material 34 to the wheel applicator. The vacuum wheel 98 further defines a circumferential surface 102 onto which the strip of web material 34 rides. Located just above the vacuum wheel 98 is the cutter wheel 38 preferably having a plurality of knives 104 of a like plurality and even angular spacing as the anvils 100 on the vacuum wheel 98 so that the vacuum wheel 98 and the cutting wheel 38 can be driven with respect to one another at a 1:1 ratio. It is understood that the number of knives 104 could be any integral fraction of the number of anvils 100. For instance, with two anvils, one knife could be used if the cutting wheel 38 is driven at a 2:1 ratio to the vacuum wheel 98. Moreover, the vacuum wheel 98 and cutting wheel 38 are timed with respect to one another such that an anvil 100 engages a knife 104 at a cutting point (105) along the peripheral edge of the vacuum wheel 98 located on a line connecting the axis of rotation of the vacuum wheel 98 to the axis of rotation of the cutting wheel 38. The cutting wheel 38 is keyed to rotate with a drive shaft 106 which is connected with a drive means (not shown) in accordance with the above.

Furthermore, and as described above, the timing at which the knife 104 engages an anvil 100 at the cutting point 105 is coordinated with the assumption of the air bar 66 and pivot arm 60 in the position midway between its uppermost and lowermost at which the air bar 66 has its greatest velocity. The movement of the air bar 66 to this position of maximum velocity at the time when cutting is to occur reduces the size of the loop formed by the air bar 66 in the strip of web material 34 and increases the feed rate of the strip of web material 34 above that of the constant feed rate that is determined by the drive rollers 54 and 56. More specifically, the rate of advance of the leading edge of the strip of web material 34 is increased to substantially match the surface speed of the circumferential surface 102 of the vaccum wheel 98 so that there is minimal relative movement therebetween during the time that the cutting takes place at cutting point 105. The vacuum wheel 98 is rotated at a constant speed such that the surface speed of the circumferential surface 102 is maintained higher than the constant feed rate of the strip of web material 34. Thus, the leading edge of the strip of web material normally slides over the circumferential surface 102 except for that instance when cutting takes place. The vacuum wheel 98 is driven by a drive means more fully described below.

Also provided with the vacuum wheel 98 is a vacuum manifold 108 which is located adjacent a front face 110 of the vacuum wheel 98 and which is non-rotationally held in place by a bracket 112 which is fixed to the support plate 18. The bracket 112 also supports a vacuum line 114 which runs from a vacuum source 116 and is in fluid communication with a manifold passage 118 of the vacuum manifold 108. The vacuum wheel 98 is provided with radial passages 120 which open to orifices 122 open through the circumferential surface 102. The vacuum source 116, vacuum line 114, manifold passage 118, radial passages 120, and orifices 122 in the circumferential surface 102 together define a means for holding the strip of web material 34 and the discrete lengths of web material 12 against the circumferential surface 102 of the vacuum wheel 98 as well as for carrying the discrete lengths of web material 12 at the surface speed of the circumferential surface 102 of the vacuum wheel 98 from the cutting point 105 to an application point of the discrete lengths of web material 12 to the moving articles 14. Such features will be more fully understood with the description of FIG. 2 below.

Another feature illustrated in FIG. 1 as part of the wheel applicator 40 is a guide assembly comprising an edge guide disc 124 which is positioned adjacent the vacuum wheel 98 and underneath the vacuum wheel 98 as illustrated in FIG. 1. The edge guide disc 124 advantageoulsy rotates with the vacuum wheel 98, but rotates eccentricallly with respect thereto. In other words, the edge guide disc 124 rotates about an axis of rotation which is offset by a distance X from the axis of rotation of the vacuum wheel 98. Moreover, the axis of rotation of the edge guide disc 124 is preferably located along the line and between the axis of rotation of the vacuum wheel 98 and the cutter wheel 38. Thus, the edge guide disc 124 extends above the circumferential surface 102 of the vacuum wheel 98 at the cutting point 105 but is moved radially inward from the circumferential surface 102 at and near the application point. By this manner, a guide surface is advantageously provided to precisely align the strip of web material 34 to the cutting point 105, but which does not obstruct the application of the discrete lengths of web material 12. Moreover, the retention of the edge guide disc 124 along with and at the speed of the vacuum wheel 98 beneficially helps to pull along the strip of web material 34 in alignment with the edge guide disc 124. The manner of mounting and driving the edge guide disc 124 with respect to the vacuum wheel 98 will be more fully described below.

FIG. 2 is a cross-sectional view taken along line A—A of FIG. 1 illustrating the manner of drive and connection of the vacuum wheel 98 to the edge guide disc 124 and an associated drive means. The vacuum wheel 98 and edge guide disc 124 are rotationally supported relative to the support plate 18 by a shaft housing 126 which is fixed to support plate 18 by an annular portion 128 thereof and a plurality of bolts 130. The annular portion 128 exhibits an internal surface 132 which receives an outer race 134 of a roller bearing also including rollers 136 and an inner race 138. The inner race 138 is press fit to rotate with a central drive shaft 140. Between the central drive shaft 140 and the annular portion 128 of the housing 126, a seal 142 and retaining ring 144 are also provided. The retainer ring 144 is secured to the annular portion 128 of the housing 126 by bolts or screws 145.

Fixed to rotate with the central drive shaft 140 by way of bolts 146 is a first disc 148 which together with a second disc 150 make up the vacuum wheel 98. The second disc 150 is fixedly secured to the first disc 148 by bolts 152. Thus, the vacuum wheel 98 comprising both discs 148 and 150 rotates with the central drive shaft 140 about the axis of rotation 154 of the central drive shaft 140.

The second disc 150 is machined on its face that abuts the first disc 148 with a plurality of radial grooves which when the first and second discs 148 and 150, respectively, are fixed together define the plurality of radial passages 120 for vacuum transmission. At the radial outwardmost end of each of the radial passages 120, a bore 156 is provided substantially parallel to the axis of rotation of the vacuum wheel 98, and a plurality of orifice forming passages 158 are provided connecting each bore 156 to a plurality of orifices 122 through the circumferential surface 102 of the vacuum wheel 98. At the radial inwardmost ends of the radial passage 120, a like plurality of openings 160 are provided passing through the second disc 150. These openings 160 connect with the manifold passage 118 of the vacuum manifold 108. Note, with reference to FIG. 1, that the manifold passage 118 preferably does not extend along the entire circle of the vacuum manifold 108 but only from a point near where the strip of web material 34 first contacts the vacuum wheel 98 to about the point of application of the discrete lengths of web material 12 to the articles 14. The manifold passage 118 is preferably machined into the side face 162 of the vacuum manifold 108 which contacts and rides against the side face 110 of the vacuum wheel 98. Vacuum is supplied to the manifold passage 118 from the vacuum line 114 by way of an appropriate fitting which passes through the bracket 112 and threads to an opening provided through the vacuum manifold 108 at 164.

In order to maintain the side face 162 of the stationary vacuum manifold 108 properly against the side face 110 of the rotating vacuum wheel 98, and to substantially guard against vacuum loss therebetween, a plurality of biasing means 168 are preferably provided acting between the bracket 112 and the vacuum manifold 108 urging vacuum manifold 108 against vacuum wheel 98. Each biasing means 168 comprises a compression spring 170 which acts against the inner surface 172 of the bracket 112 and against a ledge 174 formed in the vacuum manifold 108. A sliding alignment pin 176 is also provided extending within the compression spring 170, fixed to bracket 112 by a bolt or screw 178, and slidingly disposed within a bore 180 through the vacuum manifold 108. By such arrangement, the vacuum manifold 108 is prevented from rotation and is urged effectively against the side face 110 of the vacuum wheel 98.

The edge guide disc 124 is eccentrically supported to rotate about the annular portion 128 of the shaft housing 126 by way of a roller bearing assembly 182. The inner race of the roller bearing 182 is fixed with an outer circumferential surface of a slide ring 184 which is in turn slidably disposed to move axially on the annular portion 128 of housing 126 but which is keyed as at 186 to prevent relative rotation between the slide ring 184 and the annular portion 128. The slide ring 184 is urged away from the support plate 18 by a plurality of compression springs 188 fitted within alignment recesses of the support plate 18 and slide ring 184. The compression springs 188 are utilized to urge the edge guide disc 124 against the vacuum wheel 98 as will be more fully understood from the description below.

The outer race of the roller bearing assembly 182 is fixed to rotate with a first disc portion 190 which together with a second disc portion 192 secured to the first disc portion 190 by screws or bolts 194 constitute the edge guidge disc 124. Thus, the edge guide disc 124 is rotatable about the annular portion 128 by way of the roller bearing assembly 182 and slide ring 184. The edge guide disc 124 could be constructed from a single disc instead of the two disc portions 190 and 192; however, the two disc portions are preferred so that the one disc portion 192 that engages the vacuum wheel 98 can be made of a stick resistant material such as teflon. The other disc portion 190 being made of a strength material such as metal.

The external circumferential surface of the annular portion 128 of housing 126 defines a circle which is eccentric to the axis of rotation 154 of the central drive shaft 140. The eccentric circle and thus the edge guide disc 124 have an axis of rotation 195 which is offset by the distance X from the axis of rotation 154 of the vacuum wheel 98. As can be seen in FIG. 2, there is a greater radial distance between the head of the upper bolt 130 and the bearing assembly 182 than the radial distance between the head of the lower bolt 130 and the roller bearing assembly 182. More specifically, the outer surface of the annular portion 128 is eccentric such that the greatest offset is provided along the line connecting the axis of rotation of the cutting wheel 38 and the axis of rotation 154. Such ensures edge guiding at the cutting point 105 while preventing obstruction by the edge guide disc 124 at the point of application.

The edge guide disc 124 is driven to rotate with the vacuum wheel 98 by way of a pin 196 fixed with the first disc 148 of the vacuum wheel 98 and a slot 198 formed in both disc portions 190 and 192 of the edge guide disc 124. FIG. 2*a* illustrates the pin and slot arrangement which rotationally drives the edge guide disc 124 via side edges of the slot 198 and permits the edge guide disc 124 to move radially about its eccentric axis 195 as the pin 96 moves along the length of the slot 198.

In order to drive the vacuum wheel 98, the central drive shaft 140 passes through the shaft housing 126. A drive pulley 200 is preferably fixed with the central drive shaft 140 so as to rotate therewith. Then, the pulley 200 and the central drive shaft 140 are rotationally driven by a drive belt 202. The drive belt 202 also passes over a similar drive pulley of a drive motor (not shown). It is understood that a conventional drive motor can be used which is capable of driving the belt 202 and thus the central drive shaft 140 at a substantially constant speed. It is further understood that other transfer means could be used instead of the belt 202 and pulley 200 such as chains and sprokets or gear drives which are direct or indirect. Moreover, the drive means for each of the drive shafts discussed above, namely shaft 44 of reel 42, shaft 52 of reel 46, shaft 55 of drive roller 54, shaft 57 of drive roller 56, the shaft of drive disc 76, shaft 106 of the cutter wheel 38 and the central drive shaft 140 of vacuum wheel 98 can be driven from a single motor source. In such a case, the angular velocity that each shaft is driven must be coordinated according to the required timing principles enumerated above for operation of the machine. Such can be conventionally accomplished by choosing the appropriate size of the drive pulleys or sprockets for each coordinated drive shaft. If independent motors, whether electric, hydraulic, or other are utilized for each drive shaft, a control system is provided to control such rotational speeds in accordance with well known principles.

With reference now to FIG. 3, a cross-sectional view taken along line B—B in FIG. 2 is shown, but with the vacuum wheel 98 rotated from the position shown in FIG. 1 to a point such that the anvil 100 is located substantially at the cutting point 105. As can be seen, a discrete length of web material 12 is shown as having just been cut from the leading edge of the strip of web material 34. Note also that the edge guide disc 124 is illustrated in its radial outwardmost position for guiding both the discrete length of web material 12 and the strip of web material 34 near the cutting point 105.

The anvil 100 is located within a recess 204 defined within both the first and second discs 148 and 150, respectively, of the vacuum wheel 98. A similar but preferably slightly larger cutout 206 is also provided in the edge guide disc 124. The anvil 100 rests against the bottom of the recess 204 and is urged toward a substantially straight side 208 of the recess 204 by a wedge element 210 which is locked in place by bolts or screws 212. The wedge element 210 is provided with a sloped side 214 which engages a similarly sloped side 216 of the recess 204. Thus, as the wedge element 210 is urged downwardly by the bolts 212, the engagement between sides 214 and 216 causes the wedge element 210 to be urged against the anvil 100 to secure it in place. Above the wedge element 210, a recess 218 is defined within which the knife 104 moves during the cutting operation.

Referring now to FIG. 4 which is a cross-sectional view taken along line C—C in FIG. 3, the width of the knife 104 and the anvil 100 are illustrated as extending beyond the recess 204 and into the recess 206 of the edge guide plate 124. The knife 104 and anvil 100 are specifically designed wider than the strip of web material being cut because a more even and clean cut results.

In the operation of the applicator machine 10 formed in accordance with the present invention, a strip of web material 34 is supplied from a source 30, such as reel 42, and is fed from the drive rollers 54 and 56 at a substantially constant feed rate. The vacuum wheel 98 is rotated at a like rotational speed as the cutter wheel 38 so that the circumferential surface 102 of the vacuum wheel 98 has a surface speed greater than the feed rate of the strip of web material 34. Note that the vacuum wheel 98 and cutter wheel 38 are rotated in opposite rotational directions. Then, as the strip of web material 34 passes over the air bar 66 toward the circumferential surface 102, the rate of movement of the pivot arm 60 of the wobbler arm loop forming means 36 changes the relative speed of the leading edge of the strip of web material 34 by changing the loop size defined by the means 36. As above, at the instance of cutting, the air bar 66 is moved toward its upwardmost position to increase the speed of the strip of web material to substantially match the surface speed of the circumferential surface 102. Normally, the strip of web material 34 slides on the faster moving circumferential surface 102 of the vacuum wheel 98, except at the instances of cutting. When each of the anvils 100 come to the cutting point 105, a knife 104 also comes to the cutting point 105 and a discrete length of web material 12 is severed from the strip 34. Such is shown in FIG. 3.

In the meanwhile, as the strip of web material 34 passes around the air bar 66, it is cushioned by the pressurized air exiting orifices 96. Thus, the strip of web material 34 is not subjected to roller inertia, as was experienced in prior art machines and amplified above in the Background section, and the discrete lengths of web material 12 are consistently cut to exact lengths. At the same time, an edge of the strip of web material 34 rides against the surface of the edge guide disc 124, as clearly shown in FIG. 4. In order to ensure that the strip of web material 34 actually rides against the edge guide disc 124 when approaching the cutting point 105 it is desirable to thread the strip of web material 34 through the drive rollers 54 and 56 during set-up slightly more inwardly (that is into the page when looking at FIG. 1) than the guiding surface of the edge guide disc 124. The amount of shifting is largely dependent on the size of the machine and type of materials processed. Then, the vacuum wheel 98 transfers the discrete lengths of web material 12 from the cutting point 105 to the application point at the speed of the vacuum wheel 98 by virtue of the vacuum at the orifices 122. The vacuum at the orifices 122 holds the discrete length of web material 12 in its precise location at which it was cut as influenced by the guiding of the edge guide disc 124. Lastly, the discrete length of web material can be applied at the application point to the article 14 moved continuously under the vacuum wheel 98. Since the discrete length of web material 12 is precisely located on the vacuum wheel, it then can be very precisely located on the article 14 at the application point.

It is also contemplated that, as stated above, the above-described machine is capable of applying discrete lengths of web material consisting of tapes, films, foils or the like. It is further contemplated that virtually any type of adhesive tape could be handled and applied.

In another example, a strip having a heat activated sealant layer could be applied. The subject device lends itself particularly effective for activating or assisting in the activation of the sealant layer wherein the sealant layer could be activated by heated air supplied through the air bar 66 as the strip passes thereover. Thus, the air bar 66 would advantageously provide a strip guiding and a sealant activating function. Specific examples of suitable heat activated sealants that could be provided as a layer to a strip of web material are polyethylene or EVA sealants, which can be heat activated by hot air supplied at about 200° F. or higher.

One specific article to which the present invention is applicable is a carton blank that when assembled forms a gable-top container. Furthermore, it is desirable to precisely locate a small strip of stiff material to the container blank which is part of an easy opening feature of the container. The precise location of the strip of stiffening material is required for the easy opening feature effectiveness.

Such gable-top container blanks to which the present invention is particularly applicable are described in the following U.S. patents to Wyberg commonly owned by the assignee of present invention: U.S. Pat. No. 4,712,727 issued Dec. 15, 1987; 4,756,426 issued Jul. 12 1988; U.S. Pat. No. 4,762,234 issued Aug. 9, 1988; U.S. Pat. No. 4,792,048 issued Dec. 20, 1988; U.S. Pat. No. 4,813,547 issued Mar. 21, 1989; 4,813,548 issued Mar. 21, 1989; U.S. Pat. No. 4,869,372 issued Sep. 26, 1989; U.S. Pat. No. 4,869,373 issued Sep. 26, 1989 and U.S. Pat. No. 4,872,562 issued Oct. 10, 1989, each of which is fully incorporated herein by reference.

In the example shown in FIG. 7, side seam flap 311 is connected to one lateral edge 310 of a body member for sealing to the edge of another body member 302 by the container sealing process. Bottom closure means 326 is shown as a group of bottom closure panels 314 through 321 attached to the body members along bottom score line 313, and extending downward therefrom. Bottom closure score lines 322 through 325 enable bottom closure panels 314, 316, and 318–321 to be folded under closure panels 315 and 317 and sealed to provide a leak-proof container bottom. Such a closure means is well known in the art. A separately formed structure may alternatively be used to close the bottom of the container. In fact any closure means which results in a satisfactorily tight seal may be used.

The gable-top of the container is formed from a series of panels above top score line 333. First and second roof panels 331 and 332 are connected to the upper edges of the first and second side panels 303 and 305, respectively. The roof panels are oppositely disposed and when erected, converge upwardly to meet along score line 345 to form a gable roof. Connected to the upper edge of the front panel 304 is a first substantially triangular end panel 329 whose two lateral edges 334 and 335 formed by score lines extend upwardly to score line 345. Similarly, second triangular end panel 330 is connected to the upper edge of back panel 302, and has lateral edges 336 and 337 which extend upwardly to score line 345.

On each side of triangular end panel 329 is a foldback panel. First foldback panel 341 is connected to triangular end panel 329 along edge 334, and to first roof wing panel 338 along score line 308. Panel 341 has score line 345 as its upper edge. Similarly, second foldback panel 342 is connected to triangular end panel 329 along edge 335, and to second roof wing panel 339 along score line 309. It has score line 345 as its upper edge.

Similarly, third and fourth foldback panels 343 and 344 are connected to triangular end panel 330 along lateral edges 337 and 336, respectively. When the carton is erected, the fourth foldback panel 344 is attached to the second roof panel 332 by flap 311. Edge 306 is then generally continuous with score line 310. The third foldback panel 343 is connected to the first roof panel 331 along score line 307.

Attached to the upper edge of each foldback panel 341, 342, 343 and 344 along score line 345 is a gable rib panel 346, 347, 348 and 349, respectively. Similarly, attached to the upper edge of first and second roof panels 331 and 332 are first and second roof rib panels 354 and 355, respectively. First and second gable rib panels 346 and 347 are connected to each other at a common score line 351, and third and fourth gable rib panels 348 and 349 are connected to each other at common score line 350. The uppermost end 352 of line 351 is the tip of the pouring spout of the erected container.

First gable rib panel 346 is connected to first roof rib panel 354 at score line 308, and second gable rib panel 347 is connected to second roof rib panel 355 at score line 309.

First roof wing panel 338 comprises a triangular portion of first roof panel 331 defined by score lines 340, 345 and 308, and is adjacent first foldback panel 341. Second roof wing panel 339 comprises a triangular portion of second roof panel 332, and is defined by score lines 340, 345 and 309. Panel 339 is adjacent second foldback panel 342. These roof wing panels are more or less coextensive with the adjacent foldback panel when the erected container is closed.

A first upper rib panel 357 is connected to the upper edge of the first roof rib panel 354. Likewise, a second upper rib panel 358 is connected to the upper edge of the second roof rib panel 355. The score line 359 separates the upper rib panels from the adjacent roof rib panels, and is substantially continuous with the free upper edge 353 of the first and second gable rib panels 346 and 347. The latter panels serve as lips of the pouring spout of the erected container.

The score lines may be applied to blank 301 before or after an optional thermoplastic coating is applied to the blank. The score lines may be applied to either surface or both surfaces of the blank. For purposes of clearer delineation of the various panels, score lines are shown in the drawings on either or both of the inner and outer surfaces of the blank and container.

In the embodiment shown in FIG. 7, a single discrete length of web material comprising a stiffening fillet 356 overlies portions of the first and second gable rib panels 346 and 347. Fillet 356 comprises a strip 361 of stiff material having a layer 362 of adhesive on one surface, by which the strip is bondingly attached to the outer surface 363 of the gable rib panels 346 and 347. Strip 361 may be formed from any solid material which is resistant to deleterious effects of the container sealing process, and is sufficiently rigid so that, together with adhesive layer 362, it provides sufficient strength to reinforce the panel to achieve the necessary stiffness.

Strip 361 must not melt, extrude, or otherwise degrade at the conditions, e.g., elevated temperature and pressure, of the container sealing process. Of course, a container sealing process of significant compression of the panels at an elevated temperature may tend to increase the area of intimate contact and relieve elastic stresses, causing adhesion of the abutting strip surfaces 369, or adhesion of strip surface 369 to the panel outer surface 363, if fillet 356 is present on only one of the gable rib panels 346 or 347. The bond strength of this pressure-produced adhesion will, however, be significantly less than the bond strength of the adhesive layer 362 which bonds strip 361 to the gable rib panel 346 or 347.

Material such as metallic foil, polyester film and polycarbonate film are examples of strip materials which are unaffected by the temperatures used for sealing panels coated with polyethylene, and have a sufficiently high modulus of elasticity. Thermoplastic coatings like polyethylene are typically sealed at temperatures of 250° to 400° F. (81° and 205° C.).

FIG. 8 is an enlarged view of that area of the blank of FIG. 7 to which a modified single stiffening fillet 356' is provided. As can be seen, the fillet 356' must be very specifically aligned with respect to the score lines 308 and 309 and more importantly to the edge 353 of the blank.

FIG. 9 is view similar to that in FIG. 8 except that the single stiffening fillet 356'' further overlies panels 342 and 341.

FIG. 10 illustrates a single stiffening fillet 356''' similar to that in FIG. 9 except that the blank edge 353 is profiled and so is the upper edge of the stiffening fillet 356'''. In order to profile the stiffening fillet 356''', the nip roller 58 illustrated in FIG. 1 can be replaced by a profiled cutting wheel which cuts the profile into the strip of web material 34 as it passes between the drive roller 56 and the cutting wheel 58.

In each of the above described examples of articles to which the present invention is applicable it is important to accurately position the stiffening fillet 356 on the container blank. Particularly, it is desirable to place such fillets within a tolerance limit of 1 mm. The present invention advantageously provides such a precise alignment. This precise alignment results from the use of the edge guide disc 124 and the air bar 66 in the above described applicator machine 10.

It is further understood that the applicator machine 10 of the present invention could be used to apply any number of films, tapes, foils, or the like and can be used to position various lengths and profiles of discrete lengths of such web material to articles of unlimited sizes and shapes. The only requisite is that the strip of web material have an edge, whether profiled or not, which can be guided effectively by the edge guide disc 124. Moreover, the edge guide disc and/or the air bar could be used on a machine that applys or laminates a continuous strip of web material to an article or continuous web conveyed through the machine. In this case, it is unnecessary to include a cutting wheel, and the vacuum wheel is rotated to have substantially the same surface speed as the feed rate of the strip of web material, thus defining the application or lamination speed. The edge guide disc advantageously guides the strip of web material laterally to an exact line on the vacuum wheel, which thus precisely aligns the strip of web material onto the article or continuous web. Moreover, the edge guide disc does not obstruct the application of the strip of web material to the article or continuous web as it recedes radially below the circumferential surface of the vacuum wheel at the application point.

I claim:

1. A wheel applicator and guide assembly for transferring and applying web material to an article that is moved continuously adjacent to the periphery of said applicator wheel, said wheel applicator including means for holding the web material against a circumferential surface of said wheel applicator and for carrying the web material from a first point at the periphery of said wheel applicator to an angularly spaced point of application and a means for driving said wheel applicator at a predetermined speed, said guide assembly comprising an edge guide means rotatable with said applicator wheel that is provided adjacent to said applicator wheel so as to extend radially outward beyond said circumferential surface of said applicator wheel at said first point for guiding an edge of the web material at said first point and which moves relative to said applicator wheel; to a position radially inward of said circumferential surface of said applicator wheel at said point of application.

2. The assembly of claim 1, wherein said wheel applicator is a vacuum wheel and said means for holding the web material comprises a vacuum source means operatively connected with vacuum passages provided within said vacuum wheel which open to the circumferential surface of said vacuum wheel.

3. The assembly of claim 1, wherein said edge guide means rotates about an eccentric axis of rotation that is mounted offset to an axis of rotation of said applicator wheel by a distance which defines the degree to which said edge guide means extends radially outward beyond and radially inward of said circumferential surface of said wheel applicator at said first point and said application point, respectively.

4. The assembly of claim 3, wherein said applicator wheel is operatively connected to a central drive shaft defining the axis of rotation of said applicator wheel which is rotatably supported by a shaft housing, and said edge guide means comprises an edge guide disc which is rotationally supported by a circumferential surface of an annular portion that is fixed relative to said said shaft housing, wherein said circumferential surface of the annular portion defines a circle having a center point on said eccentric axis.

5. The assembly of claim 4, further wherein a slide ring is provided between said circumferential surface of said annular portion and said edge guide disc said slide ring being rotationally fixed with said annular portion and axially movable on said annular portion, and a bias means is provided operatively acting between said shaft housing and said slide ring to urge said slide ring and thus said edge guide disc against said applicator wheel.

6. The assembly of claim 5, wherein said edge guide disc is further comprised of a plurality of disc portions with a portion that contacts against said applicator wheel made of a stick resistant material.

7. The assembly of claim 4, wherein said edge guide disc is rotationally driven with said applicator wheel by said applicator wheel by way of a connection means for rotating said edge guide disc with said applicator wheel while permitting radial movement of said edge guide disc relative to said applicator wheel which results from the offset between axes of rotation as the edge guide disc and applicator wheel are rotated.

8. The assembly of claim 7, wherein said connection means comprises a pin extending from one of said edge guide disc and said applicator wheel and a radial slot provided in the other.

9. The assembly of claim 1, wherein said guide assembly further comprises a means for forming a loop in a supplied strip of web material to be handled by said applicator wheel and for cyclically increasing and decreasing the size of the formed loop to change the feed rate of the strip of web material to said applicator wheel.

10. The assembly of claim 9, wherein said means for forming a loop in a supplied strip of web material comprises an air bar reciprocably movably disposed relative to said applicator wheel by a means for cyclically moving said air bar and a pressurized air source means for supplying air to said air bar, said air bar having a bearing surface over which the strip of web material is to pass and at least one passage through said air bar operatively connecting said air source means to an orifice defined through said bearing surface.

11. The assembly of claim 10, wherein said pressurized air source means comprises a hot air supply connected to said air bar so that hot air is discharged from said orifice at a temperature sufficient for activating a heat activated sealant provided on the web material to be applied by said wheel applicator.

12. A wheel applicator and guide assembly for transferring and applying a discrete length of web material to an article that is moved continuously adjacent to the periphery of said applicator wheel, said wheel applicator including means for holding the web material against a circumferential surface of said wheel applicator and for carrying the discrete lengths of web material from a first point at the periphery of said wheel applicator to an angularly spaced point of application and a means for driving said wheel applicator at a predetermined speed, said guide assembly comprising a means for forming a loop in a supplied strip of web material to be handled by said applicator wheel and for cyclically increasing and decreasing the size of the formed loop to change the feed rate of the strip of web material to said applicator wheel, wherein said means for forming a loop in a supplied strip of web material comprises an air bar reciprocably movably disposed relative to said applicator wheel by a means for cyclically reciprocably moving said air bar for increasing and decreasing the size of the formed loop and a pressurized air source means for supplying air to said air bar.

13. The assembly of claim 12, wherein said air bar further comprises a bearing surface over which the strip of web material is to pass and at least one passage through said air bar operatively connecting said air source means to an orifice provided through said bearing surface.

14. The assembly of claim 13, wherein said pressurized air source means comprises a hot air supply connected to said air bar so that hot air is discharged from said orifice at a temperature sufficient for activating a heat activated sealant provided on the web material to be applied by said wheel applicator.

15. The assembly of claim 13, wherein a plurality of orifices are provided opening through said bearing surface with radial passages connecting between an axial air supply passage of said air bar and said orifices, said air supply passage being connected to an air line of said air source means, and said orifices and radial passages being arranged at evenly spaced angular intervals over at least a portion said bearing surface over which the strip of web material will ride.

16. The assembly of claim 12, wherein said wheel applicator is a vacuum wheel and said means for holding the web material comprises a vacuum source means operatively connected with vacuum passages within said vacuum wheel which open to the circumferential surface of said vacuum wheel.

17. The assembly of claim 12, wherein said guide assembly further comprises an edge guide means rotatable with said applicator wheel that is provided adjacent to said applicator wheel so as to extend radially outward beyond said circumferential surface of said applicator wheel at said first point for guiding an edge of the web material at said first point and which moves relative to said applicator wheel to a position radially inward of said circumferential surface of said applicator wheel at said point of application.

18. The assembly of claim 17, wherein said edge guide means rotates about an eccentric axis of rotation that is mounted offset to an axis of rotation of said applicator wheel by a distance which defines the degree to which said edge guide means extends radially outward beyond and radially inward of said circumferential surface of said wheel applicator at said first point and said application point, respectively.

19. The assembly of claim 18, wherein said applicator wheel is operatively connected to a central drive shaft defining the axis of rotation of said applicator wheel which is rotatably supported by a shaft housing, and said edge guide means comprises an edge guide disc which is rotationally supported by a circumferential surface of an annular portion that is fixed relative to said said shaft housing, wherein said circumferential surface of the annular portion defines a circle having a center point on said eccentric axis.

20. For use in an applicator machine including a source of a strip of web material, a means for driving the strip of web material at a substantially constant feed rate, and a rotatably driven cutting wheel having at least one knife at the periphery thereof, an applicator wheel and guide assembly for transferring and applying discrete lengths of the web material to articles that are moved continuously adjacent to the periphery of said applicator wheel, said wheel applicator including at least one anvil against which the knife of the cutting wheel engages during rotation of said applicator wheel and the cutting wheel in order to cyclically cut the strip of web material into discrete lengths, means for holding the web material against a circumferential surface of said wheel applicator and for carrying the discrete lengths of web material from a cutting point at the periphery of said of said wheel applicator to an angularly spaced point of application, and a means for driving said wheel applicator at a predetermined speed which is faster than the substantially constant feed rate of the strip of web material, said guide assembly comprising an edge guide means rotatable with said applicator wheel that is provided adjacent to said applicator wheel so as to extend radially outward beyond said circumferential surface of said applicator wheel at said cutting point for guiding an edge of the web material at said cutting point and which moves relative to said applicator wheel to a position radially inward of said circumferential surface of said applicator wheel at said point of application.

21. The assembly of claim 20, wherein said guide assembly further comprises a means for forming a loop in the supplied strip of web material before being handled by said applicator wheel and for cyclically increasing and decreasing the size of the formed loop to thereby change the feed rate of the strip of web material to said applicator wheel.

22. The assembly of claim 21, wherein said means for forming a loop in a supplied strip of web material comprises an air bar reciprocably movably disposed relative to said applicator wheel by a means for cyclically moving said air bar and a pressurized air source means for supplying air to said air bar, said air bar having a beaingp surface over which the strip of web material is to pass and at least one passage through said air bar operatively connecting said air source means to an orifice provided through said bearing surface.

23. For use in an applicator machine including a source of a strip of web material, a means for driving the strip of web material at a substantially constant feed rate, and a rotatably driven cutting wheel having at least one knife at the periphery thereof, an applicator wheel and guide assembly for transferring and applying discrete lengths of the web material to articles that are moved continuously adjacent to the periphery of said applicator wheel, said wheel applicator including at least one anvil against which the knife of the cutting wheel engages during rotation of said applicator wheel and the cutting wheel in order to cyclically cut the strip of web material into discrete lengths, means for holding the web material against a circumferential surface of said wheel applicator and for carrying the discrete lengths of web material from a cutting point at the periphery of said wheel applicator to an angularly spaced point of application, and a means for driving said wheel applicator at a predetermined speed which is faster than the substantially constant feed rate of the strip of web material, said guide assembly comprising a means for forming a loop in the supplied strip of web material before being handled by said applicator wheel and for cyclically increasing and decreasing the size of the formed loop to thereby change the feed rate of the strip of web material to said applicator wheel, wherein said means for forming a loop in a supplied strip of web material comprises an air bar reciprocably movably disposed relative to said applicator wheel by a means for cyclically reciprocably moving said air bar for increasing and decreasing the size of the formed loop and a pressurized air source means for supplying air to said air bar.

24. The assembly of claim 23, wherein said air bar includes a bearing surface over which the strip of web material is to pass and at least one passage through said air bar operatively connecting said air source means to an orifice provided through said bearing surface.

25. The assembly of claim 23, wherein said guide assembly further comprises an edge guide means rotatable with said applicator wheel that is provided adjacent to said applicator wheel so as to extend radially outward beyond said circumferential surface of said applicator wheel at said cutting point for guiding an edge of the web material at said cutting point and which moves relative to said applicator wheel to a position radially inward of said circumferential surface of said applicator wheel at said point of application.

26. The assembly of claim 25, wherein said edge guide means rotates about an eccentric axis of rotation that is mounted offset to an axis of rotation of said applicator wheel by a distance which defines the degree to which said edge guide means extends radially outward beyond and radially inward of said circumferential surface of said wheel applicator at said cutting point and said application point, respectively.

27. The assembly of claim 26, wherein said applicator wheel is operatively connected to a central drive shaft defining the axis of rotation of said applicator wheel which is rotatably supported by a shaft housing, and said edge guide means comprises an edge guide disc which is rotationally supported by a circumferential surface of an annular portion that is fixed relative to said said shaft housing, wherein said circumferential surface of the annular portion defines a circle having a center point on said eccentric axis.

28. An applicator machine including a source of a strip of web material, a means for driving the strip of web material at a substantially constant feed rate, a means for forming a loop in the supplied strip of web material and for cyclically increasing and decreasing the size of the formed loop to thereby change the feed rate of the strip of web material, a rotatably driven cutting wheel having at least one knife at the periphery thereof, and a wheel applicator and guide assembly for transferring and applying discrete lengths of the web material to articles that are moved continuously adjacent to the periphery of said wheel applicator, said wheel applicator including at least one anvil against which said knife of said cutting wheel engages during rotation of said wheel applicator and said cutting wheel in order to cyclically cut the strip of web material into the discrete lengths, means for holding the web material against a circumferential surface of said wheel applicator and for carrying the discrete lengths of web material from a cutting point at the periphery of said of said wheel applicator to an angularly spaced point of application, and a means for driving said wheel applicator at a predetermined speed which is faster than the substantially constant feed rate of the strip of web material, said guide assembly comprising an edge guide means rotatable with said wheel applicator that is provided adjacent to said wheel applicator so as to extend radially outward beyond said circumferential surface of said wheel applicator at said cutting point for guiding an edge of the web material at said cutting point and which moves relative to said wheel applicator to a position radially inward of said circumferential surface of said wheel applicator at said point of application.

29. The machine of claim 28, wherein said means for forming a loop in a supplied strip of web material comprises an air bar reciprocably movably disposed relative to said wheel applicator by a means for cyclically moving said air bar and a pressurized air source means for supplying air to said air bar, said air bar having a bearing surface over which the strip of web material passes and at least one passage through said air bar operatively connecting said air source means to an orifice provided through said bearing surface.

30. An applicator machine including a source of a strip of web material, a means for driving the strip of web material at a substantially constant feed rate, a means for forming a loop in the supplied strip of web material and for cyclically increasing and decreasing the size of the formed loop to thereby change the feed rate of the strip of web material, a rotatably driven cutting wheel having at least one knife at the periphery thereof, and a wheel applicator for transferring and applying discrete lengths of the web material to articles that are moved continuously adjacent to the periphery of said wheel applicator, said wheel applicator including at least one anvil against which said knife of said cutting wheel engages during rotation of said wheel applicator and said cutting wheel in order to cyclically cut the strip of web material into the discrete lengths, means for holding the web material against a circumferential surface of said wheel applicator and for carrying the discrete lengths of web material from a cutting point at the periphery of said wheel applicator to an angularly spaced point of application, and a means for driving said wheel applicator at a predetermined speed which is faster than the substantially constant feed rate of the strip of web material, said means for forming a loop in the supplied strip of web material comprises an air bar reciprocably movably disposed relative to said wheel applicator by a means for cyclically reciprocably moving said air bar for increasing and decreasing the size of the formed loop and a pressurized air source means for supplying air to said air bar.

31. The machine of claim 30, wherein said air bar further includes a bearing surface over which the strip of web material passes and at least one passage through said air bar operatively connecting said air source means to an orifice provided through said bearing surface.

32. The machine of claim 30, further including a guide assembly comprising an edge guide means rotatable with said wheel applicator that is provided adjacent to said wheel applicator so as to extend radially outward beyond said circumferential surface of said wheel applicator at said cutting point for guiding an edge of the web material at said cutting point and which moves relative to said wheel applicator to a position radially inward of said circumferential surface of said wheel applicator at said point of application.

33. The assembly of claim 32, wherein said edge guide means rotates about an eccentric axis of rotation that is mounted offset to an axis of rotation of said applicator wheel by a distance which defines the degree to which said edge guide means extends radially outward beyond and radially inward of said circumferential surface of said wheel applicator at said cutting point and said application point, respectively.

34. The assembly of claim 33, wherein said applicator wheel is operatively connected to a central drive shaft defining the axis of rotation of said applicator wheel which is rotatably supported by a shaft housing, and said edge guide means comprises an edge guide disc which is rotationally supported by a circumferential surface of an annular portion that is fixed relative to said said shaft housing, wherein said circumferential surface of the annular portion defines a circle having a center point on said eccentric axis.

35. A wheel applicator and guide assembly for transferring and applying web material to an article that is moved continuously adjacent to the periphery of said applicator wheel, said wheel applicator including means for holding the web material against a circumferential surface of said wheel applicator and for carrying the web material from a first point at the periphery of said wheel applicator to an angularly spaced point of application and a means for driving said wheel applicator at a predetermined speed, said guide assembly comprising a means for forming a loop in a supplied strip of web material to be handled by said applicator wheel, wherein said means for forming a loop in a supplied strip of web material comprises an air bar including a bearing surface with an orifice for directing air against the web material to urge the web material away from said bearing surface, said air bar being supported in position to said applicator wheel and operatively connected to a pressurized hot air source means for supplying hot air to said air bar at a temperature sufficient to activate a heat activated sealant provided on the strip of web material to be applied by said applicator wheel.

* * * * *

UNITED STATES PATENT AND TRADEMARK OFFICE

CERTIFICATE OF CORRECTION

PATENT NO. : 5,261,996
DATED : November 16, 1993
INVENTOR(S) : Steven J. Rossini It is certified that error appears in the above-indentified patent and that said Letters Patent is hereby corrected as shown below:

Abstract, lines 1 and 2, delete "are provided in order"

Col. 1, line 63, "described" should be --are described--.

Col. 2, line 10, "type" should be --tape--.

Col. 2, line 42, "be relying" should be --by relying--.

Col. 13, line 31, "pin 96" should be --pin 196--.

Col. 18, line 37, "wheel; to" should be --wheel to--.

Signed and Sealed this

Seventh Day of January, 1997

Attest:

BRUCE LEHMAN

*Attesting Officer* *Commissioner of Patents and Trademarks*